US008452879B1

(12) United States Patent
Upadhyay et al.

(10) Patent No.: US 8,452,879 B1
(45) Date of Patent: *May 28, 2013

(54) ALLOCATION OF CONNECTION PERSISTENCE TO MOBILE BROWSERS

(75) Inventors: Piyush Upadhyay, Overland Park, KS (US); Badri P. Subramanyan, Overland Park, KS (US); Ayodeji Abidogun, Overland Park, KS (US); William J. Routt, Leawood, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,233

(22) Filed: May 1, 2012

Related U.S. Application Data

(63) Continuation of application No. 12/335,602, filed on Dec. 16, 2008, now Pat. No. 8,204,998.

(51) Int. Cl.
*G06F 15/16* (2006.01)
*G06F 15/173* (2006.01)
*H04M 3/42* (2006.01)
*H04W 4/00* (2009.01)

(52) U.S. Cl.
USPC ........... 709/228; 709/203; 709/223; 709/227; 455/414.1; 370/329

(58) Field of Classification Search
USPC   370/241, 311, 329, 331; 455/414.1; 709/203, 709/223, 227, 228
See application file for complete search history.

(56) References Cited

U.S. PATENT DOCUMENTS

| | | | | |
|---|---|---|---|---|
| 6,651,105 B1 * | 11/2003 | Bhagwat et al. | | 709/239 |
| 7,120,136 B2 * | 10/2006 | Upp et al. | | 370/331 |
| 7,627,658 B2 * | 12/2009 | Levett et al. | | 709/223 |
| 2003/0046336 A1 * | 3/2003 | D'Annunzio et al. | | 709/203 |
| 2006/0031520 A1 * | 2/2006 | Bedekar et al. | | 709/227 |
| 2006/0148460 A1 * | 7/2006 | Mukherjee et al. | | 455/417 |
| 2007/0243859 A1 * | 10/2007 | Dinsing et al. | | 455/414.1 |
| 2007/0291691 A1 * | 12/2007 | Gorokhov | | 370/329 |
| 2008/0014981 A1 * | 1/2008 | Venkatachalam | | 455/528 |
| 2009/0249244 A1 * | 10/2009 | Robinson et al. | | 715/781 |
| 2009/0252072 A1 * | 10/2009 | Lind et al. | | 370/311 |
| 2011/0096741 A1 * | 4/2011 | Strahm et al. | | 370/329 |
| 2011/0128858 A1 * | 6/2011 | Matta et al. | | 370/241 |

* cited by examiner

*Primary Examiner* — Bharat N Barot
*Assistant Examiner* — Vitali Korobov

(57) ABSTRACT

A method, system, and medium are provided for determining whether a persistent or non-persistent connection should be given to a device that requested a web page. In one embodiment, upon receiving a request for the web page, the characteristics of the web page are evaluated to determine whether a persistent connection will be efficiently used when accessing with the web page. In another embodiment, the requesting user's behavior may be evaluated to determine whether, based on past behavior, the user will effectively use a persistent connection to the requested web site. A persistent connection is granted to requesting browsers most likely to make efficient use of the persistent connection based on the characteristics of the requested web site and/or the requesting user's browsing habits.

6 Claims, 2 Drawing Sheets

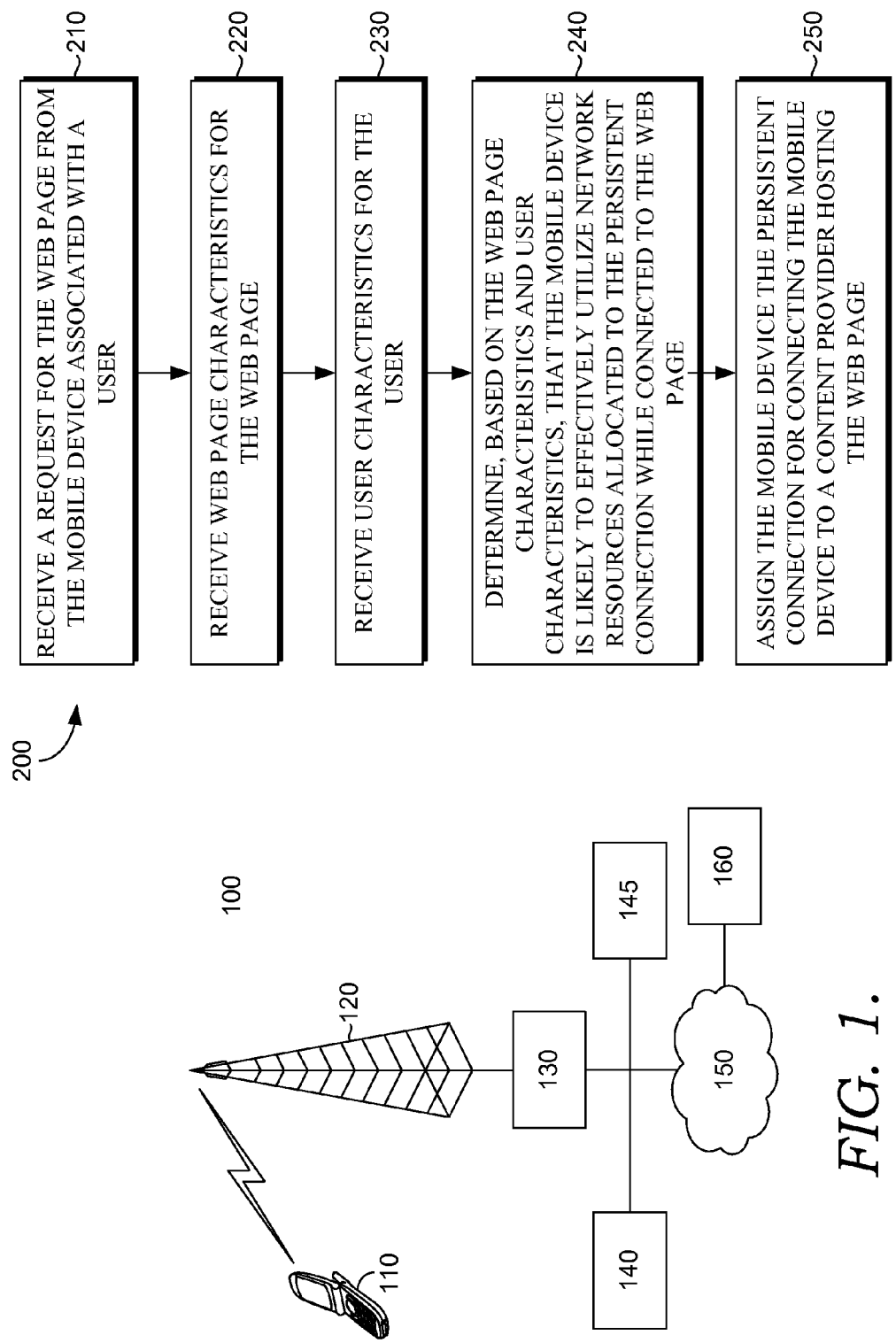

ALLOCATION OF CONNECTION PERSISTENCE TO MOBILE BROWSERS

CROSS-REFERENCE TO RELATED APPLICATIONS

This application is a continuation of U.S. patent application Ser. No. 12/335,602, filed Dec. 16, 2008, the entirety of which is incorporated by reference herein.

SUMMARY

The present invention is defined by the claims below. Embodiments of the present invention distribute a limited number of persistent connections to mobile devices that are most likely to effectively use the persistent connection. Radio access networks may provide a persistent or a non-persistent connection between a web server and a mobile browser that is running on a mobile device (e.g., cell phone, smart phone, PDA) connected to the network. A persistent connection maintains the connection between a web browser and content provider during multiple transactions. A non-persistent connection terminates after one transaction and requires that a new connection be set up for each transaction. In embodiments of the present invention, a web proxy uses the characteristics of the requested web page and the browsing habits of the requesting user to determine whether a persistent connection should be assigned. Other characteristics, such as a requesting browser's ability to pipeline may also be considered when assigning persistent connections. Embodiments of the present invention help allocate persistent connections to users most likely to effectively use network resources allocated to a persistent connection.

In a first illustrative embodiment, one or more computer-storage media having computer-executable instructions embodied thereon for performing a method of assigning a persistent connection to a mobile device requesting a web page are provided. The method includes receiving a request for the web page from the mobile device associated with a user and receiving a plurality of web page characteristics for the web page. The method further includes receiving a plurality of user characteristics for the user and determining, based on the plurality of web page characteristics and the plurality of user characteristics, that the mobile device will effectively utilize network resources allocated to the persistent connection while connected to the web page. The method further includes assigning the mobile device the persistent connection that connects the mobile device to a content provider hosting the web page.

In another illustrative embodiment, one or more computer-storage media having computer-executable instructions embodied thereon for performing a method of assigning a persistent connection to a mobile device are provided. The method includes receiving a request for a web page from the mobile device associated with a user. The method further includes receiving a plurality of web page characteristics for the web page. The method also includes determining, based on the plurality of web page characteristics, that the mobile device will effectively utilize network resources allocated to the persistent connection while connected to the web page. The mobile device will effectively utilize network resources allocated to the persistent during connection to the web page when above a threshold number of requests are generated during the persistent connection. The method also includes determining, based on the plurality of web page characteristics, an optimal duration during which the mobile device will effectively utilize network resources allocated to the persistent connection while connected to the web page and assigning the mobile device the persistent connection for the optimal duration.

In a third illustrative embodiment, a computerized system for allocating connections to web content is provided. The system includes a web proxy that receives a request for a connection to a web page from a requesting device that is associated with a user. The request asks for a persistent connection to the web page. The system also includes a data store containing a plurality of web page characteristics and a plurality of user characteristics. The web proxy determines that the requesting device will effectively utilize network resources allocated to the persistent connection while connected to the web page based on the plurality of web page characteristics and the plurality of user characteristics. The web proxy determines an optimal duration of the persistent connection using the plurality of web page characteristics and the plurality of user characteristics. The web proxy assigns the persistent connection having the optimal duration to the requesting device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1 is a drawing of an illustrative environment in which an embodiment of the present invention may operate;

FIG. 2 is a flow diagram in which a method of assigning a persistent connection to a mobile device requesting a web page is described, according to an embodiment of the present invention.

DETAILED DESCRIPTION

Figure 3:
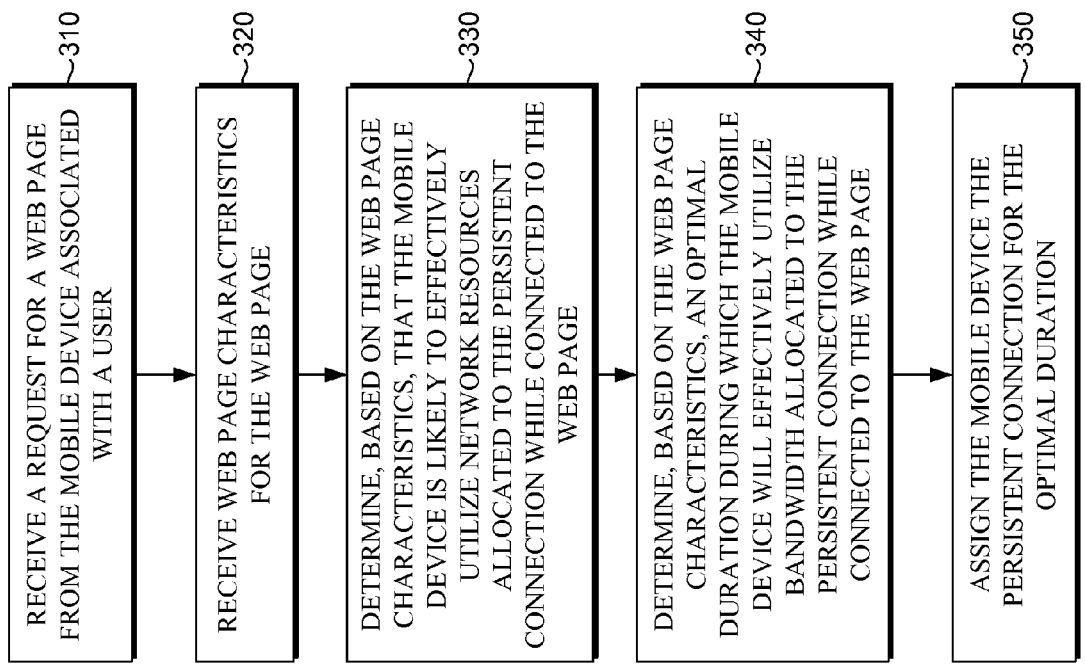
FIG. 3 is a flow diagram in which a method of assigning a persistent connection to a mobile device is described, according to an embodiment of the present invention.

Embodiments of the present invention provide systems and methods for optimizing the allocation of persistent connections to devices that will effectively use the persistent connection. Under some network conditions, there are more devices requesting persistent connections than there are persistent connections available. Under those conditions some of the requesting devices will be given non-persistent connections. In many cases, devices request persistent connections by default even though a persistent connection will not be effectively utilized by the device and is not needed. In embodiments of the present invention, characteristics of the requested web page, browsing characteristics of a requesting device's user, and device capabilities are evaluated to determine whether a requesting device is likely to make effective use of the persistent connection. These characteristics may also be evaluated to determine the optimal length of a persistent connection. Based on these characteristics, the devices that are likely to make effective use of the persistent connection may be given a persistent connection for the optimal length of time.

In general, a persistent connection effectively uses network resources when the network resources allocated to the persistent connection are actually used at close to their capacity during the persistent connection. For example, if only 10% of the network bandwidth allocated to the persistent connection is used over the duration of the persistent connection then the bandwidth may not be effectively utilized. An effective use of the persistent connection may occur when multiple requests and responses are made during a short period of time. If a persistent connection is given, but very few requests are made during the persistent connection, then the network resources allocated to the persistent connection are not used to their potential capacity.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CPU | Central Processing Unit |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile Communications |
| IP | Internet Protocol |
| IETF | Internet Engineering Task Force |
| LAN | Local Access Network |
| LCD | Liquid Crystal Display |
| PDA | Personal Digital Assistant |
| PDSN | Packet Data Serving Node/Home Agent |
| RAM | Random Access Memory |
| ROM | Read Only Memory |
| SIP | Session Initiation Protocol |
| TDMA | Time Division Multiple Access |
| URL | Uniform Resource Locator |
| WAN | Wide Area Network |
| 3GPP | $3^{rd}$ Generation Partnership Project |

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and non-removable media, and contemplates media readable by a database, a switch, and various other network devices. By way of example, and not limitation, computer-readable media comprise media implemented in any method or technology for storing information, such as computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to mobile devices. An illustrative operating environment 100 that contains a few of the components within such a communication network is shown in FIG. 1. The components shown in FIG. 1 are just some of the components used during operation of embodiments of the invention. The components shown in FIG. 1 are described in brief, and with an emphasis on function for the sake of simplicity. The components within FIG. 1 are communicatively coupled to each other in a manner appropriate for carrying out their respective functions within the illustrative operating environment 100. Embodiments of the present invention are not limited by the communication protocols or formats used to facilitate communication between components, those mentioned are for the sake of enablement and not meant to be limiting.

Illustrative operating environment 100 includes mobile device 110, base station 120, gateway 130, proxy 140, data store 145, network 150, and content server 160. Illustrative operating environment 100 is merely an example of one suitable environment and is not intended to suggest any limitation as to the scope of use or functionality of the present invention. Neither should illustrative operating environment 100 be interpreted as having any dependency or requirement related to any single component or combination of components illustrated therein.

Mobile device 110 is a wireless terminal that is adapted to receive communications and media over the wireless networks included in illustrative operating environment 100. Specifically, mobile device 110 may access content (e.g., web pages) over the Internet. Some lower-level details of mobile device 110 are not shown so as to not obscure embodiments of the present invention. For example, mobile device 110 may include a bus that directly or indirectly couples the following devices: memory, one or more processors, one or more presentation components such as a display or speaker, input/output (I/O) ports, I/O components, and a power supply such as a battery. The display device is suitable for viewing media content such as web pages, movies, videos, video calls, or television shows. A LCD screen is one example of a display that might be used on the mobile device 110. Mobile device 110 may communicate via wireless protocols, such as code division multiple access ("CDMA"), global system for mobile communications ("GSM"), or time division multiple access ("TDMA"), as well as others, to communicate with base station 120.

Mobile device 110 may take on any of a variety of forms. By way of example, mobile device 110 may be a mobile telephone, smart phone, computing device, personal digital assistant ("PDA") or any combination of these or other devices. Mobile device 110 has the ability to present one or more forms of media content. Examples of media content that could be displayed include web pages, TV shows, movies, and videos. This list is not exhaustive. The media may be presented as it is received from the wireless network or from memory within mobile device 110. Mobile device 110 may also be capable of receiving one or more forms of communication. Examples of communications that may be received include phone calls, video calls, text messages, multimedia messages, emails, calendar updates, and task reminders.

Base station 120 is a fixed station used for communicating with mobile device 110. Standard air interface protocols, such as code division multiple access ("CDMA"), global system for mobile communications ("GSM"), or time division multiple access ("TDMA"), as well as others, may be used by base station 120 to communicate with mobile device 110. Other network communication interface arrangements are also possible. A base station controller (not shown) is responsible for handling traffic and signaling with mobile device 110. Only one base station 120 is shown, and without its many components, for the sake of clarity. Mobile device 110 could be in simultaneous communication with multiple base stations.

Access gateway 130 provides a boundary between radio communication functions embodied in one or more radio access networks that form the access-facing portion of illustrative operating environment 100 and the standard internet protocol ("IP") communication functions (including Mobile IP) embodied in the public-network facing portion (e.g., network 150) of illustrative operating environment 100. Access gateway 130 might be, for example, an ASN-GW, a PDSN, a SGSN/GGSN, and the like.

Proxy 140 is a combination of hardware and software. The hardware aspect is a computing device that may include a CPU, short term memory, long term memory, and one or more network interfaces. The network interface is used to connect to a LAN, WAN (including the Internet), or other variety of communications network. The network interface to the WAN or LAN could be wired, wireless, or both. In one embodiment, software on proxy 140 receives web page requests from mobile devices connected to the radio access network associated with the proxy 140. The proxy 140 establishes a connection between the content server 160 hosting the web page and the requesting mobile device 110. The connection may be a persistent connection or a non-persistent connection. A non-persistent connection maintains a connection between devices for a single transaction that may consist of a request and a response. A persistent connection maintains a connection between devices during multiple requests and responses. Different durations may be assigned to different persistent connections.

In an embodiment of the present invention, the proxy 140 may manage the transmission of data between mobile device 110 and content server 160, which is hosting a requested web page. The proxy 140 may receive a request for the web page from mobile device 110. The request may contain a request for a persistent connection. For example, the request may be an http request with the "connection" field having the attribute "keep-alive." The proxy 140 has a limited number of network resources to utilize when managing the communications between multiple mobile devices and one or more content providers on the Internet. In one embodiment, the proxy 140 has a fixed number of persistent connections to assign to mobile devices as well as a number of non-persistent connections. Ideally, the proxy 140 wants to assign persistent connections to mobile devices that are most likely to effectively utilize the network resources, such as bandwidth, associated with a persistent connection. As described previously, network resources are likely to be effectively utilized if multiple requests are sent between the mobile device and the web page within a short period of time.

To determine whether a requesting mobile device, such as mobile device 110, should be given a persistent connection to the requested website, the proxy 140 may retrieve web page characteristics and user characteristics from data store 145. The web page characteristics describe the number of requests typically generated when the web page is accessed. The web page characteristics may describe the number of requests typically generated when the specific user associated with the requesting mobile device accesses the web page, or the average number of requests generated when any user accesses the web page. Other information, such as the number of images on the web page, each of which is likely to generate a request when the web page loads, may also be included in the web page characteristics.

The user characteristics may describe the user's browsing characteristics on the requested website, or websites in general. For example, the user characteristics may describe the number of requests the user typically generates when browsing a specific web page or web pages in general. User characteristics may also include the period of time between requests generated by the user. For example, some users will read an entire web page before clicking on a link or seeking a different web page, while other users quickly scan a web page and move onto another web page or click links on the web page, such as sports scores, soon after the page loads. The user that quickly scans the web page will have, on average, a smaller time period between user generated requests.

The proxy 140 analyzes the web page characteristics and the user characteristics for the requesting user to determine whether the user will effectively utilize network resources associated with the persistent connection while accessing the requested web page. If it is determined that the user will effectively utilize network resources while accessing the requested web page, then a persistent connection is assigned to the user. Otherwise, a non-persistent connection is assigned to the user.

The proxy 140 may also determine the optimal duration of a persistent connection to assign the user. The optimal duration is the period of time during which multiple requests are likely to be generated by either the web page or the user associated with the mobile device 110. The optimal duration will have a request density above a threshold. A request density is the number of requests made during a period of time. The more requests, the higher the density. The anticipated request density may be determined using the user characteristics and web page characteristics. For example, the web characteristics may show that seven requests will be generated in the first two seconds, while the web page loads. The user characteristics may show that the user will generate a request within four seconds. Thus, the anticipated request density for the first two seconds is 3.5 requests/s and the request density for the first four seconds is 2 requests/s. If the threshold request density is 3 requests/s then the optimal duration would be a little more than two seconds, which is the point at which the request density decreases below the required request density. The proxy 140 may continually observe user behavior and web page characteristics and update the user and web page characteristics in the data store 145 periodically.

Data store 145 contains web page characteristics and user browsing characteristics stored on computer-storage media. The web page characteristics and user browsing characteristics may be accessed and used by proxy 140 to determine whether to give a persistent connection to a particular user requesting a particular web page. Web page characteristics collected in data store 145 may include the number x-ref connections on the web page, the number of requests made by the web page when loading, the size of the web page, the number of images on the web page, and the number of links on the web page. User browsing characteristics collected in data store 145 may include the average time period between requests sent by the user while browsing the requested web page, the average time period between requests sent by the user while browsing an aggregation of web pages, the number of requests made by the user per visit to the requested web page or an aggregation of web pages, whether the mobile device associated with the user is able to pipeline, and an amount of time the user spends viewing the requested web page or web pages in general. The data store 145 may contain one or more databases or other data storage structures for storing the user behaviors and the web page characteristics.

Network 150 is a wide area network (WAN) and may include one or more mobile networks, one or more packet based networks, including the Internet, and the public switched telephone network ("PSTN"). The various components within network 150 may be owned and/or operated by multiple entities, commercial or otherwise. Network 150 is configured to transmit a variety of objects including web pages, phone calls, emails, text messaging, faxes, instant messaging, pages, voice mails, photographs, audio files, movies, TV shows, calendar reminders, task reminders and other files containing communicative content.

Content server 160 is a combination of hardware and software. The hardware aspect is a computing device that may include a CPU, short term memory, long term memory, and one or more network interfaces. The network interface is used to connect to a LAN, WAN (including the Internet), or other variety of communications network. The network interface to the WAN or LAN could be wired, wireless, or both. In one embodiment, software on content server 160 facilitates transmission of media content (e.g. web pages, movies, videos, MP3's, etc.) to mobile device 110. The content server 160 transmits the media content over the packet switched network 150. Content server 160 may be affiliated with the entity providing the mobile communication service to mobile device 110. A content server 160 is affiliated with an entity if it is owned or operated by the entity, or by a third party that has an agreement with the entity. Content server 160 may perform an access and authentication functions in response to requests to access content on the content server 160.

Turning now to FIG. 2, a method of assigning a persistent connection to a mobile device requesting a web page is described in accordance with an embodiment of the present invention. As described previously, the mobile device may be connected to a radio access network through which the mobile device may access the Internet. For example, the mobile device could be a mobile phone, smart phone, PDA, or mobile computing device. Also, as described previously, a persistent connection allows multiple requests and responses to be sent over the connection. A non-persistent connection allows only a single request and response between the mobile device and the server hosting a web page before the connection is terminated. With a non-persistent connection, the connection needs to be reestablished each time a new request is made. Requests can be generated when a user selects a link on a web page or navigates to a new page. Requests may also be generated by the web page, for example through x-refs and objects imbedded on a web page.

At step 210, a request for a web page is received from the mobile device. The mobile device is associated with a user. In one embodiment, the request is in a form of an http request. The http request will identify the requested website and will identify the user associated with the mobile device. In one embodiment, the user is identified by a client I.D. within the request's header. Other method of identifying the user may be employed in embodiments of the present invention. The user may request a website by opening a browser on the mobile device and clicking on a link, typing in a URL, selecting a website from a favorites list, and by other methods.

At step 220, a plurality of web page characteristics for the requested web page are received. The web page characteristics include characteristics associated with how many requests a web page is likely to generate during a period of time. For example, the web page characteristics may include a number of x-ref connections on the web page, a number of requests made by the web page when loading, the size of the web page, the number of images on the web page, and the number of links on the web page. In one embodiment, the web page characteristics are retrieved from a data store that tracks the web page characteristics. The web page characteristics may be updated each time a web page is accessed through a proxy associated with the data store.

At step 230, a plurality of user characteristics are received. The user characteristics describe the browsing behavior of the user associated with the mobile device. As described previously, the user may be identified by a client I.D. in the request's header. The browsing behavior may be related to the requested website or the user's online behavior in general with reference to multiple websites. Examples of user characteristics that may be received include: the average time between requests sent by the user while browsing the requested web page, the average time between requests sent by the user while browsing web pages in general, the number of requests made by the user per visit to the requested web page, the number of requests made by the user per visit to web pages in general, the average amount of time the user spends viewing the requested web page without making additional requests, the amount of time the user spends viewing an average web page without making an additional request, and whether the mobile device is able to pipeline.

At step 240, the plurality of web page characteristics and the plurality of user characteristics are used to determine that the mobile device is likely to effectively utilize network resources allocated to the persistent connection while connected to the web page. A mobile device will effectively utilize network resources if multiple requests are sent over the persistent connection during a short period of time. In other words, if the network resources allocated to the persistent connection are actually used during the persistent connection, rather than unused or under used, then the persistent connection is an effective use of network resources. Both the number of requests and the time between requests are considered in evaluating whether the network resources will be effectively utilized. In one embodiment, a threshold number of requests sent within a threshold period of time indicate that the network resources will be effectively used. If less than the threshold number of requests is sent within the threshold period of time, then the network resources are determined not to be effectively utilized and a non-persistent connection would be assigned. As described previously, the number of requests per period of time can be described as the request density.

Determining the likely number of requests to be sent during a period of time may be determined utilizing the web page characteristics and the user characteristics. The web page characteristics may be more likely to accurately predict the number of requests generated and may be given more weight in determining how many requests are likely to be sent. For example, each time a web page loads it should send the same number of requests if the web page has not been edited. For example, if a requested web page contains six images, then six separate requests may be generated during a short period of time when the web page loads. A web page containing only text may generate only a single request while loading.

In some embodiments, user characteristics may be given less weight when determining the likely number of requests to be made during the threshold period of time. Less weight may be given because the user characteristics may change. For example, a user may typically have a long period of time pass between requests for new web pages. However, if the subject matter of the web page is not interesting to the user in a particular instance the user may immediately request a new web page or click on a link on the web page. Similarly, the user may be drawn to an advertisement or other link on the web page that is usually ignored. Thus, less weight may be given to the user browsing characteristics as compared to the web page characteristics.

In one embodiment, the web page characteristics are evaluated first. If, based on the web page characteristics, above a threshold number of requests will be generated within the threshold period of time than a persistent connection is assigned, and the user characteristics are not evaluated. If, based on the web page characteristics, less than a threshold number of requests will be sent within a threshold period of time, then the user characteristics are evaluated to determine if the user is likely to generate multiple requests within a short period of time. The number of requests likely to be generated by the user, based on historical user characteristics, is added to the number of requests likely to be generated by the web page based on the web page characteristics. If the total number of requests likely to be generated is greater than the threshold number of requests, then a persistent connection will be granted.

At step 250, the mobile device is assigned a persistent connection that connects the mobile device to a content provider hosting the web page. As indicated previously, the persistent connection is assigned because it was previously determined at step 240 that the mobile device will effectively utilize the network resources allocated as part of that persistent connection. In one embodiment, the optimal duration of the persistent connection is also determined based on the plurality of web page characteristics and the plurality of user characteristics. For example, if a web page is likely to generate six requests within five seconds while loading but no requests thereafter absent user input, the optimal duration may be five seconds. On the other hand, if the web page will generate multiple requests over a fifteen-second period, then the optimal duration may be fifteen seconds. The user browsing characteristics may also be utilized to determine the optimal result. For example, if a user typically generates a request within five seconds of loading a particular web page, the optimal duration of the persistent connection may be expanded to include the anticipated request from the user. Similarly, if on a particular web page, the user characteristics indicate that multiple requests will be generated then the persistent connection may be assigned a duration to accommodate those requests. For example, if the user typically rapidly surfs through sports scores on a sporting web page, or makes multiple requests for stock quotes on a financial web page, a persistent connection may be assigned for the typical historical duration of the multiple requests to accommodate the anticipated multiple requests.

Turning now to FIG. 3, a method of assigning a persistent connection to a mobile device is described in accordance with an embodiment of the present invention. At step 310, a request for a web page is received from a mobile device associated with a user. As described previously, the user may be identified from a client I.D. associated with the request. Original requests for the web page may include a specific request for the persistent connection. In one embodiment, the request for the specific connection is made in an http header. For example, the attribute "connection" may be set at "keep-alive."

At step 320, a plurality of web page characteristics are received for the requested web page. The web page characteristics may be received from a data store that tracks web page characteristics relevant to determining whether a persistent connection should be assigned to a mobile device requesting the web page.

At step 330, the mobile device is determined to be likely to effectively utilize network resources allocated to the persistent connection while connected to the web page. This determination is made based on the plurality of web page characteristics. The mobile device will effectively utilize network resources when above a threshold number of requests are generated during a threshold period of time. For example, if the threshold number of requests is six and the threshold period of time is ten seconds, then a web page that typically generates six requests within five seconds would effectively utilize network resources.

At step 340, the optimal duration during which the mobile device will effectively utilize network resources allocated to the persistent connection is determined based on the plurality of web page characteristics. Various metrics may be used to determine the optimal duration of the persistent connection. In one embodiment, the optimal duration is the period of time during which the request density is above a threshold amount. For example, the request density may be above the threshold when the web page is loading, but fall bellow the threshold density, on average, a few seconds after the web page loads. Request density is high when there is short time period between the requests. For example, less than one second between requests may be considered a high request density.

At step 350, the mobile device is assigned to the persistent connection for the optimal duration. As indicated previously, the determination whether or not a mobile device will efficiently utilize network resources, and thus warrant a persistent connection, may also take into consideration user characteristics. Similarly, the optimal duration of a persistent connection may be determined using user characteristics in addition to the web page characteristics.

Many different arrangements of the various components depicted, as well as components not shown, are possible without departing from the spirit and scope of the present invention. Embodiments of the present invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-executable instructions embodied thereon that, when executed by a computing device, cause the computing device to perform a method of assigning a persistent connection to a mobile device requesting a web page, the method comprising:
   receiving a request for the web page from the mobile device associated with a user;
   receiving a plurality of web page characteristics for the web page;
   receiving a plurality of user characteristics for the user;
   determining, based on the plurality of user characteristics, that the mobile device will effectively utilize network resources allocated to the persistent connection while connected to the web page; and
   determining, based on the plurality of web page characteristics, an optimal duration of the persistent connection;
   assigning the mobile device the persistent connection for the optimal duration, the persistent connection that connects the mobile device to a content provider hosting the web page.

2. The media of claim 1, wherein the plurality of web page characteristics include one or more of:
   a number x-ref connections on the web page,
   a number of requests made by the web page when loading,
   size of the web page,
   a number of images on the web page, and
   a number of links on the web page.

3. The media of claim 1, wherein the mobile device will effectively utilize network resources allocated to the persistent connection while connected to the web page when the web page generates multiple transactions when loading.

4. The media of claim 1, wherein the plurality of user characteristics include one or more of an average time period between requests sent by the user while browsing the web page, a number of requests made by the user per visit to the web page, whether the mobile device is able to pipeline, and an amount of time the user spends viewing the web page.

5. The media of claim 4, wherein the mobile device will effectively utilize network resources allocated to the persistent connection while connected to the web page when the plurality of user characteristics indicate that the user typically initiates multiple requests within a threshold time period when viewing the web page.

6. The media of claim 1, updating the plurality of user characteristics each time the user accesses one or more of a new web page and a previously viewed web page.

* * * * *